No. 838,301. PATENTED DEC. 11, 1906.
D. J. CAMPBELL.
CATTLE CRATE.
APPLICATION FILED OCT. 4, 1905.

Witnesses:
M. Macaulay
G. Piotrkowsky

D. J. Campbell
Inventor
by A & B Harvey
his Attorneys

UNITED STATES PATENT OFFICE.

DUNCAN J. CAMPBELL, OF ARNPRIOR, ONTARIO, CANADA.

CATTLE-CRATE.

No. 838,301.     Specification of Letters Patent.     Patented Dec. 11, 1906.

Application filed October 4, 1905. Serial No. 281,349.

*To all whom it may concern:*

Be it known that I, DUNCAN JOSEPH CAMPBELL, a British subject, residing at Arnprior, in the Province of Ontario and Dominion of Canada, have invented new and useful Improvements in Cattle-Crates, of which the following is a specification.

My invention, which will be hereinafter fully set forth and claimed, reference being had to the accompanying drawings, relates to crates for weighing and transporting live stock.

The object of my invention is a crate for holding live stock—such as horses, cattle, sheep, pigs, and the like—principally for the purpose of weighing them, but also for the purpose of hoisting or transporting them, a crate into which such stock may be readily entered, in which it may be safely held, and from which it may be conveniently discharged, and which may be readily suspended when being weighed.

Figure 3:
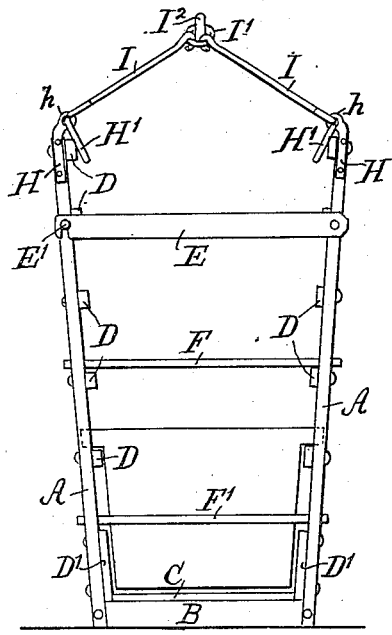
Figure 4:
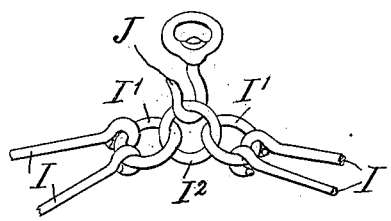
Figures 1, 2:
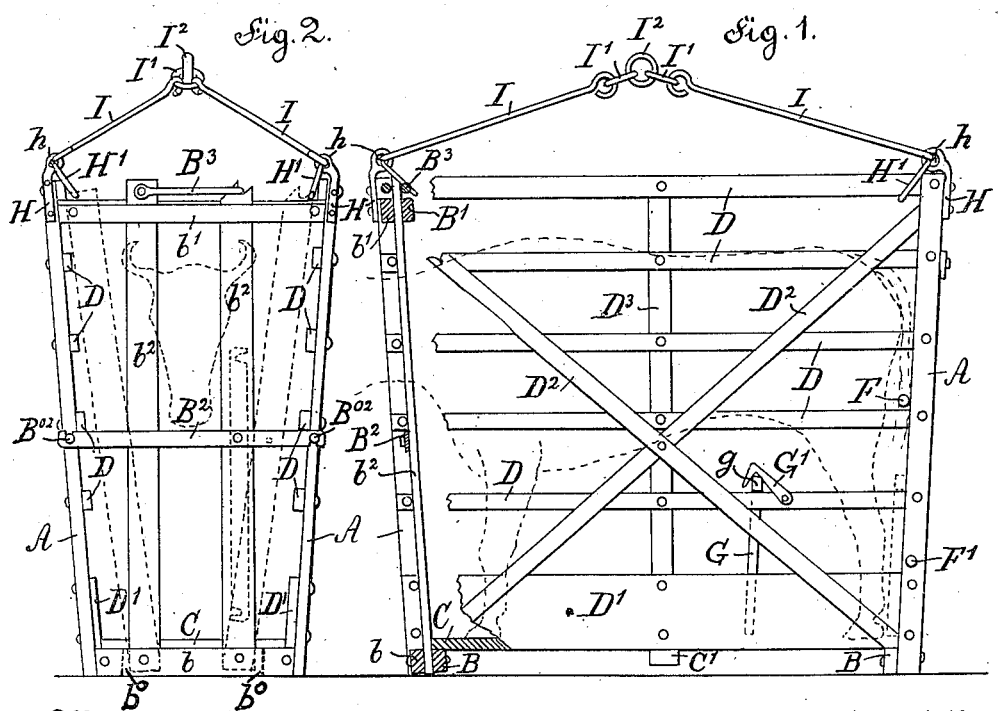

Figure 1 is a side view of my improved crate, one end being shown in section. Fig. 2 is an end view (head end) of the same. Fig. 3 is an end view (tail end) of the same shown closed, and Fig. 4 is a detail of the suspension device.

Four corner-posts A are upwardly and outwardly inclined and are connected at the bottom by two end sills B, placed inside and which carry the floor C. The head end is formed by a cross-rail B' at the top placed on the inner side of the posts. To the sill and cross-rail are secured two outer rails $b$ and $b'$ with a distance-piece $b^0$ between them at each end, so as to leave a space or slot between the inner and outer rails. In this space are secured two upright slats $b^2$ $b^2$, pivotally secured to the bottom rails by a bolt, so that they may be swung aside at the top, as shown in dotted lines. This serves for passing the head of a horse or cattle and then replacing the slats and holding them in position by a latch $B^3$, thus securing the animal by the neck, or when the slats are swung sidewise the animal may be allowed to pass out. An intermediate fastening is provided by an iron latch-bar $B^2$, pivoted to one of the slats $b^2$ and provided with transverse slots at the ends which engage headed studs $B^{02}$ on the posts.

The sides are formed of a series of rails D, secured to the corner-posts, and by a skirting-board D'. Cross-braces $D^2$ on the outside of these rails and an upright slat $D^3$, connecting the side rails and skirting-board, stiffen the sides. A cross-bar C', secured to the skirting-board, supports the floor in the center. The tail end is preferably left open entirely. A latch-bar E is pivoted to the corner-post at one end and engages a pin or staple E' by a slot or hook at the other, holding the two sides together when the crate is occupied. Another rod or two, such as F F', may be passed across to close the end.

For the purpose of confining smaller stock, such as sheep and pigs, to the head end a loose tail-board G is provided, which may be dropped into place when the stock has entered the crate, this board being formed with ears $g$, which are secured by a dog G', pivoted to one of the rails. For cattle and the like this tail-board is placed at the end, as shown dotted in Fig. 1.

To the upper end of each corner-post is secured an eye-strap H. Four rods (or chains) I hook into the eyes $h$ of these straps, one at each corner, and are gathered in the center into a ring $I^2$, which may be engaged by the hook of a weighing-machine from which the crate may be thus suspended. The rods I are preferably of unequal length—*i. e.*, the head-end rods are shorter than the tail-end rods—so that the point of suspension is thrown forward toward the head end of the crate to compensate for the greater weight usually carried at that end by the protruding head of larger animals or the empty space at the rear of the board G when smaller animals are handled. Three rings or links are preferably used, as shown in detail in Fig. 4, one, I', on each side of the central ring engaging two of the rods, which rings are equal in length to the length that the short rods are shorter than the long rods. Thus the suspending-hook J may engage the ring I' on the long rods instead of the central ring, and the point of suspension will then be in the vertical center line of the crate. Instead of three central rings five or more may be used. Each eye $h$ is also furnished with a long link H', which may be engaged by the rods I when tall stock, such as horses, requiring much head room, is confined in the crate.

The crate may be made in several sizes. For cattle a convenient size is found to be a length of six feet and a width of three feet two inches, both outside measurements taken at the top.

The sloping sides and ends give a convenient form for the requirements of larger animals, such as horses and cattle, allowing sufficient room without an undesirable abundance for such a purpose and is tending to lightness. The overhead suspension provides a safeguard against accident and also tends to lighter construction.

This crate, it will be seen, answers also the purpose of a scale pan or platform when grain in bags and the like is to be weighed or hoisted.

I claim as my invention—

1. A cattle-crate composed of four upward and outwardly sloping corner-posts, transverse end sills and longitudinal skirting-boards connecting the same at the bottom, a floor supported upon the sills, a series of rails secured to the corner-posts forming the sides, cross-braces and an upright central slat stiffening said sides, a top rail connecting the corner-posts at one end, a cross-bar at the other end hinged to one post and latched to the other post, an eye-strap at the upper end of each corner-post, suspension-rods engaging the eyes of said straps and a series of rings gathering said rods in the center from which the whole may be suspended, substantially as set forth.

2. In a cattle-crate, the combination of four upwardly and outwardly sloping corner-posts, transverse end sills connecting the lower ends of said posts, skirting-boards connecting the lower ends of said posts longitudinally, a floor supported by said sills and skirting-boards, a series of rails secured to said posts forming the sides, cross-braces stiffening said sides, an upright central slat connecting the side rails and skirting-board, a top cross-rail forming the transverse connection of the corner-posts at one end, an outer slat at the sill and top rails forming a slot between the said parts, a pair of upright slats pivoted at the lower end within said slot, a latch pivoted to one slat and holding the upper ends of said pivoted slats, a pivoted latch-bar at the tail end connecting the posts near the upper end, eye-straps at the upper ends of the corner-posts, suitable suspension devices engaging said eye-straps, a tail-board in the lower part of the tail end and pivoted dogs holding said tail-board, substantially as set forth.

3. In a cattle-crate, the combination with the four corner-posts of eye-straps at the upper ends, a link in each eye, a hooked suspension-rod engaging the eye or link at will, the two rods from one end being connected near the center by a ring and the rods at the head end shorter than those at the tail end and a central ring connecting the ring that holds the rods, substantially as set forth.

4. In a cattle-crate, the combination with four corner-posts of eye-straps at the upper ends, a suspension-rod engaging each eye, a ring connecting the other eyed ends of each two rods from one end of the crate and a central ring connecting the other two rings, substantially as set forth.

5. In a cattle-crate, the combination of four corner-posts, sills connecting the lower ends of said posts transversely, a floor supported upon said sills, a top rail connecting the posts transversely at one end, a hinged latch-bar connecting the posts at the other end, side rails and skirting-boards connecting the posts longitudinally, cross-braces and an upright slat stiffening the sides, a loose tail-board with suitable fastening devices and an overhead suspension device secured to the upper ends of the corner-posts, substantially as set forth.

6. In a cattle-crate, the combination of four sloping corner-posts, transverse sills connecting the lower ends of said posts, a floor supported on said stills, a transverse rail connecting the two corner-posts at the head end, outside rails adjacent to said top rail and sill and forming a slot between them, upright slats within said slots and pivoted to the bottom rails, a latch-bar pivoted to one of said slats and engaging studs on the posts, a latch pivoted to one of said slats at the top and engaging the other slat, longitudinal rails forming the sides and means of suspension at the upper end of said corner-posts, substantially as set forth.

In testimony whereof I have affixed my signature in presence of two subscribing witnesses.

D. J. CAMPBELL.

Witnesses:
  A. HARVEY,
  G. PIOTRZKOWSKY.